Oct. 12, 1926.
L. W. EVANS
1,603,035
CONNECTER HOOK
Filed Sept. 16, 1924
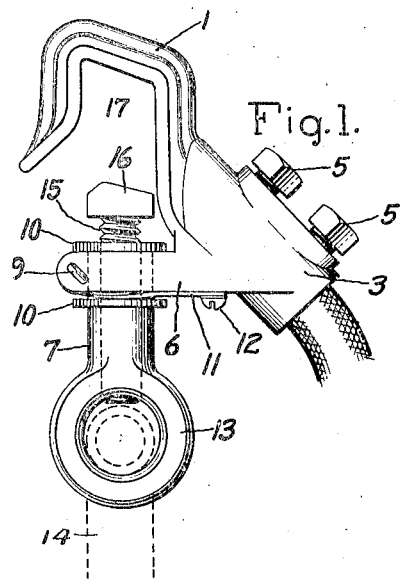
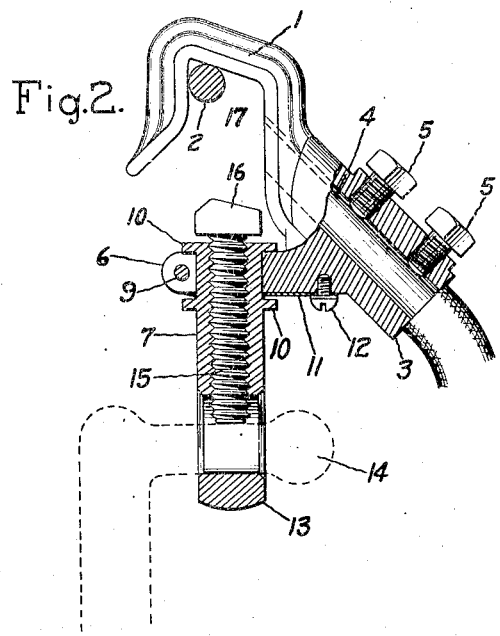
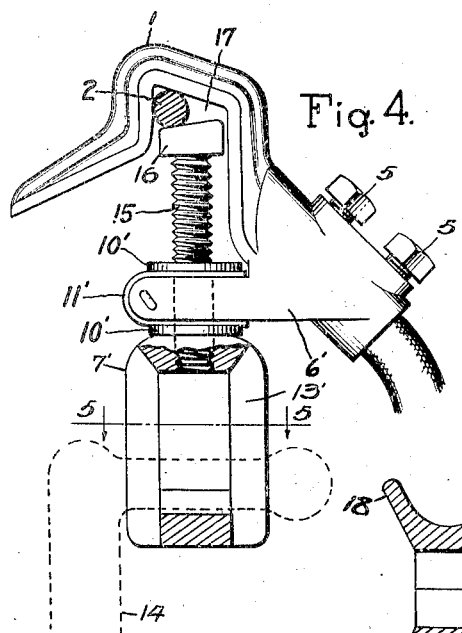
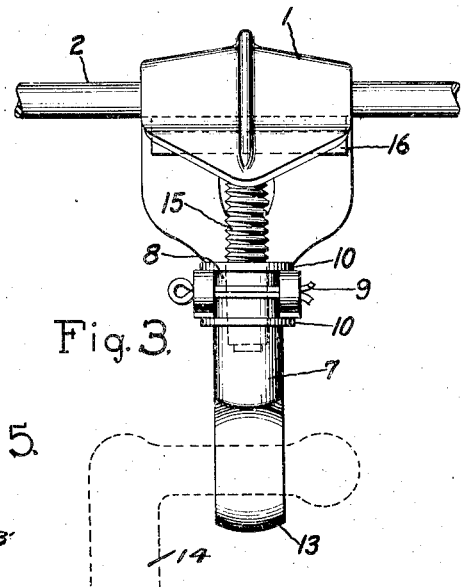
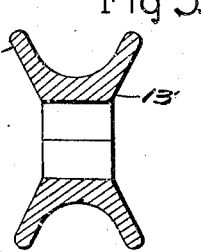
Inventor:
Lewis W. Evans,
by *Alexander S. Lunt*
His Attorney.

Patented Oct. 12, 1926.

1,603,035

UNITED STATES PATENT OFFICE.

LEWIS W. EVANS, OF PITTSFIELD, MASSACHUSETTS, ASSIGNOR TO GENERAL ELECTRIC COMPANY, A CORPORATION OF NEW YORK.

CONNECTER HOOK.

Application filed September 16, 1924. Serial No. 738,098.

The present invention relates to electric power distribution and more especially to tap off or connecter hooks whereby a branch circuit conductor may be safely connected to and disconnected from a power circuit while the latter is under full potential.

Power circuit conductors usually operate under dangerously high potential and are accordingly carried on tall poles or towers. The lineman, in order to apply the connecter hook to a power line in safety to his person, customarily employs a long rod of wood or other insulation which he manipulates while clinging to the side of the power circuit pole or tower and often during inclement or freezing weather.

The object of my invention is the provision of an improved connecter hook which may be manipulated positively and with the utmost assurance against mishap and so as to insure perfect and permanent connection with the power line.

For an understanding of my invention, reference may be had to the accompanying drawing in which Fig. 1 shows in side elevation one form of my improved connecter hook with the end of a manipulating rod indicated in dotted lines; Fig. 2 is a part side elevation and part vertical section thereof; Fig. 3 is a front elevation of the same; Fig. 4 shows in side elevation a modified form of my connecter hook, and Fig. 5 is a transverse section on line 5—5 of Fig. 4.

As shown in Figs. 1, 2 and 3, the main portion of the hook 1 is expanded transversely to provide extended contact with the transmission circuit wire 2 and in side elevation is shaped somewhat like a partially closed hand with the palm down. The diagonal lower of wrist portion 3 is drilled out for the reception of an end of the branch circuit wire 4, and disposed radially thereto in tapped holes are set screws 5 adapted for securing the branch wire 4 in place.

A bracket 6 extends horizontally from the under side of the wrist portion 3 and directly beneath the hook 1. A swiveled nut 7 is mounted in an open vertical slot 8 at the free end of the bracket 6 and is secured therein by a transverse cotter pin 9 across the open end of the slot 8.

The nut 7 is provided with spaced flanges 10 at opposite sides of the bracket 6, and a leaf spring 11, secured by a screw 12 to the under side of the bracket, presses against the lower flange 10 to act as a brake to the rotary movement of the nut. The lower end of the nut 7 is provided with an eye 13 for the reception of the usual operating pole hook 14 (shown in dotted lines, Fig. 2).

The nut 7 has threaded engagement with the stem 15 of a T-headed jaw 16 movable vertically within the wire opening 17 of the hook 1. On account of the transverse extension of the T-headed jaw 16 being disposed in adjacent parallelism with the palm wall of the hook 1, it is prevented thereby from rotating with the nut 7.

The construction shown in Fig. 4 has a nut 7' with an eye piece 13' provided with flaring corner flanges 18 which serve to guide the pole hook 14 into the eye and a U-shaped spring 11' is arranged over the free end of the bracket 6' and engages the inner sides of the flanges 10'. It is held in place by having its ends pierced and threaded over the nut 7'. Otherwise the construction of this modification is the same as that shown in Figs. 1, 2 and 3.

When my connecter hook is to be connected to a power circuit wire, the lineman enters the end of his pole hook 14 in the eye of the nut and rotates the latter left-handedly until the end of the threaded stem 15 of the movable jaw 16 impinges thereon and binds it thereto in fixed relation to the pole hook so that they are readily manipulated with assurance until the hooked part 1 is hooked over the power circuit wire 2, as indicated in Fig. 2. By rotating the the pole hook 14 right-handedly, the nut 7 causes the movable jaw 16 to rise until it impinges and binds upon and locks the power circuit wire 2 in the hook 1 and in so doing the lower end of its stem 15 is withdrawn from its engagement with the pole hook leaving the latter free to be withdrawn at will. The connecter hook is applied and removed from the power wire without the application of stress to the latter and when the jaw 16 is screwed home the device is permanently locked in binding engagement with the wire.

While I have shown and described the best embodiment of the invention known to me, I do not desire to be restricted thereto.

What I claim as new and desire to secure by Letters Patent of the United States is:—

1. A connecter hook having a hook-shaped portion, a jaw movable into and out of wire engaging relation to said hook-shaped portion, and a swiveled nut having threaded engagement with said jaw and provided with an eye for the reception of operating means.

2. A connecter hook having a hook-shaped portion, a jaw movable into and out of wire engaging relation to said hook-shaped portion and provided with a threaded stem, a swiveled nut having an operating eye and a threaded axial bore for engagement with said threaded stem, the lengths of said bore and said stem being such that the end of the latter will enter said eye in one extreme position.

3. A connecter hook having a main part comprising a hook-shaped portion, a wrist portion provided with means for attachment of an end of a conductor wire thereto and a bracket extending from said wrist portion beneath said hook-shaped portion, a nut swiveled in said bracket and provided with an eye and a threaded axial bore and a movable jaw having a threaded shank adapted to engage said bore and to extend therethrough into said eye.

In witness whereof, I have hereunto set my hand this 8th day of September, 1924.

LEWIS W. EVANS.